United States Patent
Lautenschlager et al.

[19]

[11] Patent Number: 6,041,110
[45] Date of Patent: Mar. 21, 2000

[54] METHOD AND APPARATUS FOR PROVIDING A TELECOMMUNICATIONS SERVICE

[75] Inventors: Wolfgang Lautenschlager, Weissach-Flacht; Uwe Stahl, Leonberg, both of Germany

[73] Assignee: Alcatel, Paris, France

[21] Appl. No.: 08/883,891

[22] Filed: Jun. 27, 1997

[30] Foreign Application Priority Data

Jun. 28, 1996 [DE] Germany ............................ 196 26 131

[51] Int. Cl.$^7$ .................................................. H04M 3/42
[52] U.S. Cl. ............................................. 379/201; 379/229
[58] Field of Search ................................. 379/201, 229, 379/230, 207, 93.19, 211, 93.28; 370/904

[56] References Cited

U.S. PATENT DOCUMENTS

| | | | |
|---|---|---|---|
| 4,788,720 | 11/1988 | Brennan et al. .......................... | 379/201 |
| 4,897,866 | 1/1990 | Majmudar et al. ...................... | 379/201 |
| 5,001,710 | 3/1991 | Gawrys et al. .......................... | 379/201 |
| 5,008,930 | 4/1991 | Gawrys et al. .......................... | 379/211 |
| 5,195,130 | 3/1993 | Weiss et al. ............................ | 379/93.19 |
| 5,323,452 | 6/1994 | Dickman et al. ........................ | 379/201 |
| 5,347,573 | 9/1994 | Wilde ...................................... | 379/201 |
| 5,355,404 | 10/1994 | LeDuc et al. ............................ | 379/201 |
| 5,357,557 | 10/1994 | Sakakura ................................... | 379/27 |
| 5,425,097 | 6/1995 | Pula ........................................ | 379/201 |
| 5,483,586 | 1/1996 | Sussman .................................. | 379/201 |
| 5,485,511 | 1/1996 | Iglehart et al. .......................... | 379/201 |
| 5,509,062 | 4/1996 | Carlsen .................................... | 379/201 |
| 5,517,562 | 5/1996 | McConnell .............................. | 379/201 |
| 5,541,986 | 7/1996 | Hou .......................................... | 379/201 |
| 5,544,236 | 8/1996 | Andruska et al. ....................... | 379/201 |
| 5,550,906 | 8/1996 | Chau et al. .............................. | 379/201 |
| 5,550,910 | 8/1996 | DeJager ................................... | 379/201 |
| 5,553,146 | 9/1996 | Flake ......................................... | 380/48 |
| 5,629,978 | 5/1997 | Blumhardt et al. ...................... | 379/207 |
| 5,632,017 | 5/1997 | Klein et al. .............................. | 379/93.28 |
| 5,703,940 | 12/1997 | Sattar et al. .............................. | 379/207 |
| 5,734,710 | 3/1998 | Hirth et al. .............................. | 379/201 |
| 5,740,236 | 4/1998 | Pruitt ........................................ | 379/201 |
| 5,745,553 | 4/1998 | Mirville et al. .......................... | 379/201 |
| 5,761,288 | 6/1998 | Pinard et al. ............................. | 379/201 |
| 5,790,648 | 8/1998 | Bailis et al. .............................. | 379/201 |
| 5,802,159 | 9/1998 | Smolentzov et al. ................... | 379/201 |
| 5,809,127 | 9/1998 | Ostrcil .................................... | 379/201 |
| 5,870,464 | 2/1999 | Brewster et al. ........................ | 379/201 |
| 5,883,952 | 3/1999 | Fritsche .................................... | 379/201 |

FOREIGN PATENT DOCUMENTS

| | | |
|---|---|---|
| 0669748 | 8/1995 | European Pat. Off. . |
| 2256113 | 11/1992 | United Kingdom . |
| 9525396 | 9/1995 | WIPO . |

OTHER PUBLICATIONS

"Intelligent Network Products", J–P. Euzen et al, *Electrical Communication*, vol. 63, No. 4, 1989, pp. 321–330.
"Intelligent Networks and Multimedia" M. Van Ackere et al, *Alcatel Telecommunications Review*, 1st Quarter 1996, pp. 53–61.

*Primary Examiner*—Scott Wolinsky
*Attorney, Agent, or Firm*—Ware, Fressola, Van der Sluys & Adolphson LLP

[57] ABSTRACT

A method and apparatus for providing a telecommunications service. To request the service, a service request (REQ1) is sent from a terminal (TE) to a service-providing system (SU) including part of a communications network (KN1). On receipt of the service request (REQ1), a service-specific service logic of the service-providing system (SU) is activated and a service-specific control program (PRO) is loaded from the service-providing system (SU) into the requesting terminal (TE). To provide the service, the service-specific service logic in the service-providing system (SU) cooperates with the service-specific control program (PRO) in the terminal (TE).

18 Claims, 3 Drawing Sheets

METHOD AND APPARATUS FOR PROVIDING A TELECOMMUNICATIONS SERVICE

BACKGROUND OF THE INVENTION

1. Technical Field of the Invention

This invention relates to a method of providing a telecommunications service, to a service-providing system for a communications network, to a service computer for a communications network, to a terminal for connection to a communications network, and to a communications network.

2. Background of the Invention

The subscribers of a communications network are increasingly being offered telecommunications services, such as "Service 130" (freephone). The invention is based on the assumption that such telecommunications services are provided by means of an IN architecture (IN=intelligent network).

This manner of providing telecommunications services is described, for example, in an article by J. P. Euzen et al, "Intelligent Network Products", *Electrical Communication*, Vol. 63, No. 4, 1989, pages 321 to 330.

A communications network contains a number of service switching points which are connected to a number of service control points via a No. 7 signaling network, for example. The service logics, which control the provision of services, are located centrally at the service control points. To request a service, a subscriber dials a service identification code. A connection request with the service identification code is routed to one of the service control points, which recognizes the service identification code and sends a message to the corresponding service control point. There, the service logic corresponding to the service identification code is activated. To provide the service, the service logic acts on the call-handling control in the service switching point or causes the service switching point to send messages to the requesting terminal.

With this method of providing telecommunications services, only a conventional telephone is available as a user interface, and only such a conventional telephone is supported by the service logics. This places constraints on the design of the user interface and on the development of new services.

SUMMARY OF THE INVENTION

It is an object of the invention to facilitate the introduction of more user-friendly or more complex telecommunications services.

According to a first aspect of the present invention, a method of providing a telecommunications service, comprising the steps of sending a service request from a terminal to a service-providing system of a communications network, and activating a service-specific service logic of the service-providing system upon receipt of the service request is characterized in that upon receipt of the service request, a service-specific control program is loaded from the service-providing system into the requesting terminal, and that the service-specific service logic in the service-providing system cooperates with the service-specific control program in the terminal in providing the service.

According to a second aspect of the present invention, a service-providing system for a communications network, comprising at least one service logic serving to provide a telecommunications service, a receiving unit for receiving a service request from a terminal requesting a telecommunications service, and a control unit designed to activate the service logic or a service-specific one of the service logics, is characterized in that the service-providing system further comprises a load unit for loading a service-specific control program into the requesting terminal upon receipt of the service request, and that the activated service logic is for cooperating with the service-specific control program in the terminal in providing the service.

According to a third aspect of the present invention, a service computer for a communications network, comprising at least one service logic for providing a telecommunications service and a control unit for activating the service logic or a service-specific one of the service logics upon receipt of a service request, characterized in that the control unit is for causing a service-specific control program to be loaded into the requesting terminal upon receipt of the service request, and that the activated service logic is for cooperating with the service-specific control program in the terminal in providing the service.

According to a fourth aspect of the present invention, a terminal for connection to a communications network is characterized by being provided with a memory unit for storing a control program, with a load unit for loading a service-specific control program from a service-providing system of the communications network into the memory unit, and with a control unit designed to cooperate with a service-specific service logic of the service-providing system in accordance with the loaded service-specific control program in providing a telecommunications service.

According to a fifth aspect of the present invention, a communications network for providing telecommunications services, comprising means for sending a service request in a terminal to a service-providing system of the communications network, and means for activating a service-specific service logic of the service-providing system upon receipt of the service request, is characterized in that upon receipt of the service request, a service-specific control program is loaded from the service-providing system into the requesting terminal and that the service-specific service logic in the service-providing system cooperates with the service-specific control program in the terminal in providing the service.

The basic idea of the invention is that after activation of the telecommunications service, a service-specific control program is loaded into the subscriber's terminal. The service is then provided by a service logic of the communications network in cooperation with this service-specific control program in the terminal. The control program supports the service logic in providing the service.

By the service-specific control program, which controls the operation of the subscriber's terminal, a further degree of freedom is provided for the development of telecommunications services. Furthermore, the control of the terminal is dependent on the respective service, so that a user interface adapted for a plurality of services is provided. These advantages are achieved without overburdening the logic of the terminal and without requiring specific terminals for specific services. A simple standardized terminal which can be mass-produced at low cost can form a user interface adapted for a plurality of telecommunications services. This flexibility of the terminals also makes it possible to speed up the introduction of new telecommunications services.

It is particularly advantageous to implement this novel concept for providing services using mechanisms of the IN architecture. This permits a simple implementation of the concept without major intervention in the existing telecommunications infrastructure.

These and other objects, features and advantages of the present invention will become more apparent in light of the detailed description of a best mode embodiment thereof, as illustrated in the accompanying drawing.

BRIEF DESCRIPTION OF THE DRAWING

The invention will become more apparent from the following description of two embodiments taken in conjunction with the accompanying drawings, in which.

DETAILED DESCRIPTION OF PREFERRED EMBODIMENTS

In a first embodiment, the provision of telecommunications services by the method according to invention will be described for a communications environment in which terminals according to the invention interact with a service-providing system according to the invention whose structure is based on the IN architecture and which includes a service computer according to the invention.

Figure 1:
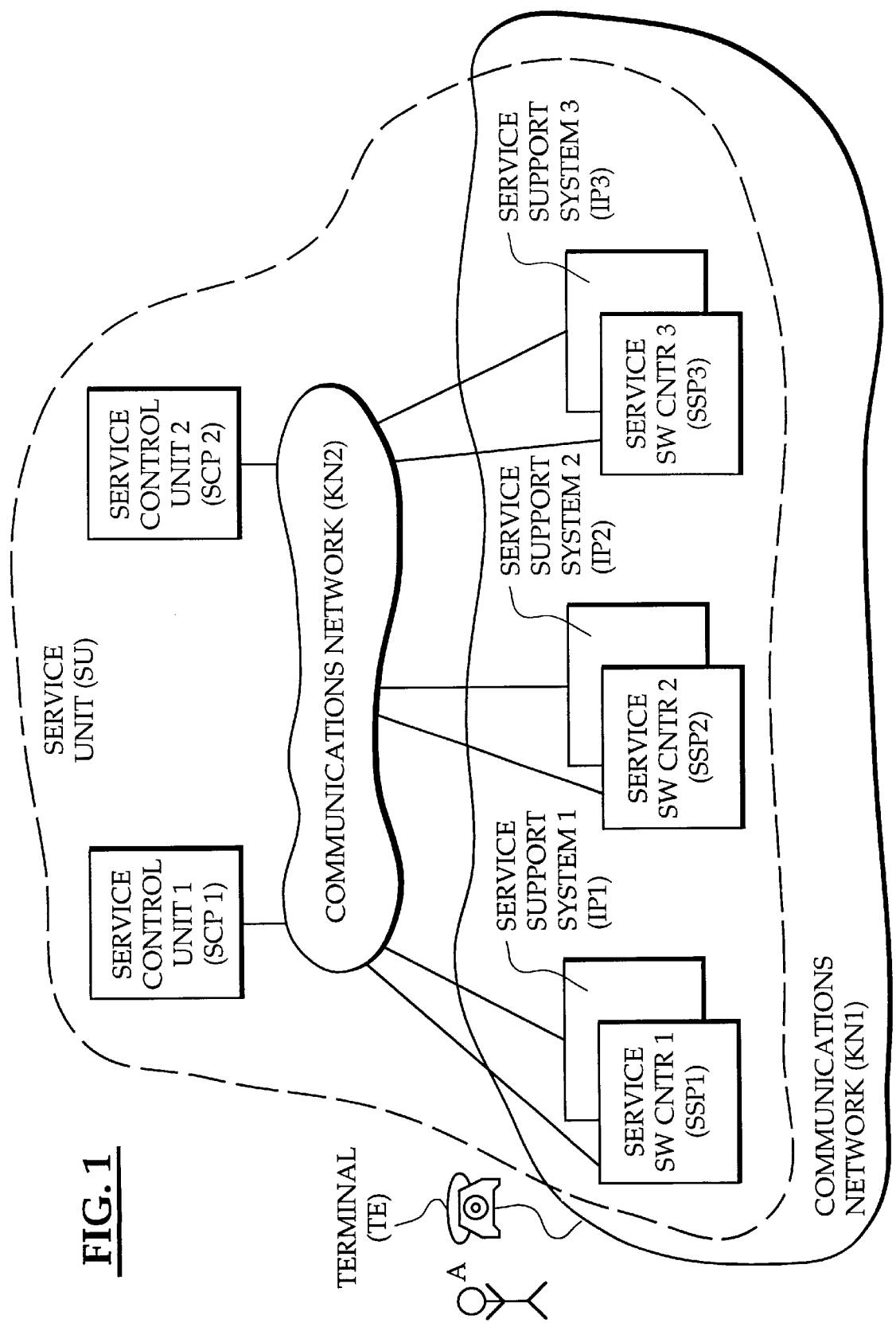
FIG. 1 is a symbolic representation of a communications environment with a service-providing system according to the invention.

FIG. 1 shows a communications network KN1, a service-providing system SU, and a terminal TE which is assigned to a subscriber A.

The terminal TE is a telephone terminal of a specific design. The service-providing system SU provides telecommunications services which are requested by the terminal TE via the communications network KN1.

The service-providing system SU is formed by several service switching centers SSP1 to SSP3, several service support systems IP1 to IP3, a communications network KN2, and several service control units SCP1 and SCP2. The service switching centers SSP1 to SSP3 and the service support systems IP1 to IP3 are connected to the service control units SCP1 and SCP2 via the communications network KN2.

The communications network KN1 is designed like a conventional telephone network and thus contains a number of switching centers. Of the switching centers, the service switching centers SSP1 to SSP3 shown in FIG. 1 are of a special design. On the occurrence of connection requests including particular service identification codes representing called subscriber numbers, they transmit inquiries over the communications network KN2 to the service control unit SCP1 or SCP2. In response to these inquiries, they receive instructions relating to the further handling of the connection request.

It is also possible to form the communications network KN1 from two or more interconnected subnetworks. Such subnetworks may be public networks of different network operators, private networks or mobile radio networks, for example.

The service support systems IP1, IP2, and IP3 are associated with the service switching centers SSP1, SSP2, and SSP3, respectively, and support the latter in providing telecommunications services, particularly in communicating with the terminals of the communications network KN1. To accomplish this, they have bearer-channel and signaling interfaces to the service switching centers SSP1 to SSP3. They are controlled directly by the service control units SCP1 and SCP2 or indirectly via the service switching centers SSP1, SSP2, and SSP3, respectively.

It is also possible to associate a service support system with two or more service switching centers. Furthermore, it is possible to integrate the function of the service support systems IP1 to IP3 into the service switching centers SSP1 to SSP3.

The communications network KN2 may be a signaling network based on the CCITT No. 7 system. It is also possible to use any other data network for the communications network KN2, e.g., an X.25 packet network.

Each of the service control units SCP1 and SCP2 represents a service computer which serves to provide one or more telecommunications services. Each of them consists of a computer, or of two or more interconnected computers, and peripheral components which, in particular, permit data communication via the communications network KN2. This hardware platform runs control programs which perform the function of a service control point and thus control particularly the provision of one or more telecommunications services.

The service-providing system SU may also be formed by only one service switching center and one service control unit.

The method according to the invention and the detailed construction of the terminal TE will now be explained with the aid of FIG. 2.

Figure 2:
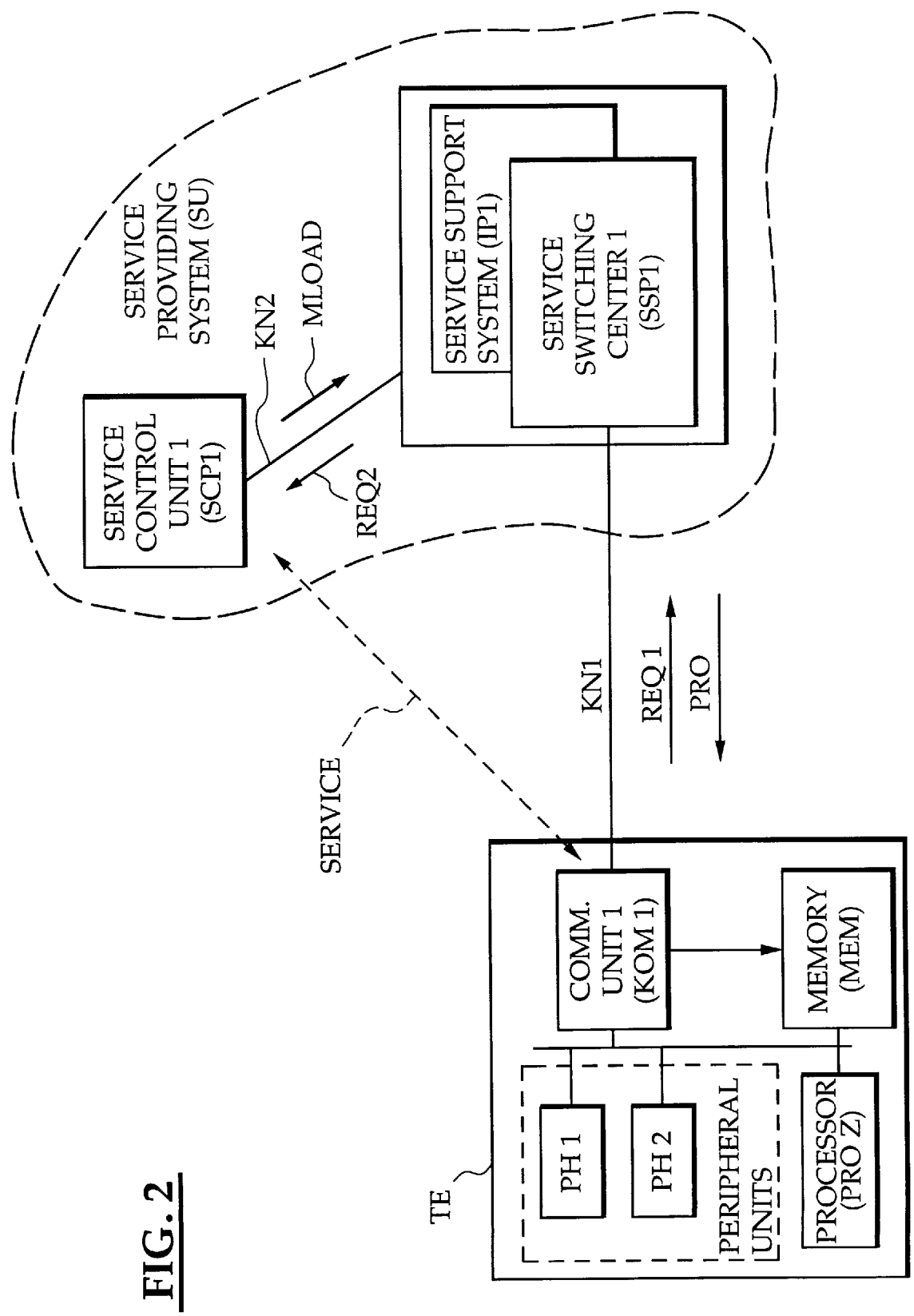
FIG. 2 is a symbolic representation of a part of the communications environment of FIG. 1.

FIG. 2 shows the terminal TE and a part of the service-providing system SU with the service switching center SSP1, the associated service support system IP1, and the service control unit SCP1.

To request a telecommunications service being offered in the communications network KN1 by the service-providing system SU, the subscriber A dials the identification code of this service at his or her terminal TE. A service request REQ1 including this service identification code, which represents the called subscriber's number is routed through the communications network KN1 and recognized as a service request by, for example, the service switching center SSP1. The service switching center SSP1 then sends a message REQ2 through the communications network KN2 to that service control unit which is responsible for providing the service specified in the connection request.

A request for a service from the service-providing system SU may also be signaled in a different way. For example, the connection requests of the subscriber A may be routed to a service switching center in accordance with the subscriber's identification code, and may automatically trigger a particular service there. The request for a service may also be signaled in a manner other than by a specific address. For example, by pushing a specific button at the terminal TE, a specific signaling message may be transmitted, which is then recognized as a service request by the service switching center SSP1.

It is also possible to route the connection request from a service switching center having no service support system to a service switching center having such a system.

On receipt of the message REQ2, the service logic assigned to the service is activated in the service control unit, e.g., the service control unit SCP1. At the same time, the service control unit SCP1 sends a message MLOAD to the service support system IP1, which then loads a control program PRO assigned to the requested service into the requesting terminal TE. The service is then provided by cooperation of the control program PRO in the terminal TE and the service logic in the service control unit SCP1. To this end, control messages SERVICE are exchanged between the terminal TE and the service control unit SCP1. After the service has been provided, the control program is erased from the terminal TE.

The terminal TE comprises a communication unit KOM1, a memory unit MEM, several peripheral components PH1 and PH2, and a processor PROZ, which are interconnected via a communications medium, such as a bus.

The communication unit KOM1 provides the interface to the communications network KN1. Thus, depending on whether the terminal is connected to the communications network via an analog subscriber access connection or an ISDN subscriber access connection (ISDN=integrated services digital network), the communications unit KOM1 consists of different hardware and software modules which permit communication via the bearer channel and handling of the signaling protocol.

The memory unit MEM is a writable storage, such as a memory chip (RAM, EPROM), or a hard-disk drive.

The peripheral components PH1 and PH2 serve to input data from the subscriber A and to output data to the subscriber A. They are input means, such as a keyboard, a mouse, a trackball or a microphone, or output means, such as a display, a viewing screen or a loudspeaker.

The processor PROZ executes control programs stored in the memory unit MEM which determine the functions and control the operation of the terminal TE.

The current control programs and the underlying hardware platform of the terminal TE form a control unit which controls the input and output of data by the components PH1 and PH2 and by the communication unit KOM1, thus determining the function of the terminal TE. On the other hand, they form a load unit which communicates with the service-providing system, controls the reception by the communication unit KOM1 of a control program to be loaded, here the control program PRO, and causes this received control program to be stored at a particular location in the memory unit MEM in accordance with a load protocol. When the control program has been completely stored in the memory unit MEM, it is incorporated into the operation of the control unit, thus contributing to the determination of the function of the terminal TE. It is possible that for the performance of its function, the control program PRO starts other control programs stored in the memory unit MEM.

It is advantageous to provide a single standardized loading method based on a standardized loading protocol according to which arbitrary control programs are loaded into arbitrary terminals.

The detailed structure of the service-providing system SU will now be described with the aid of FIG. 3.

Figure 3:
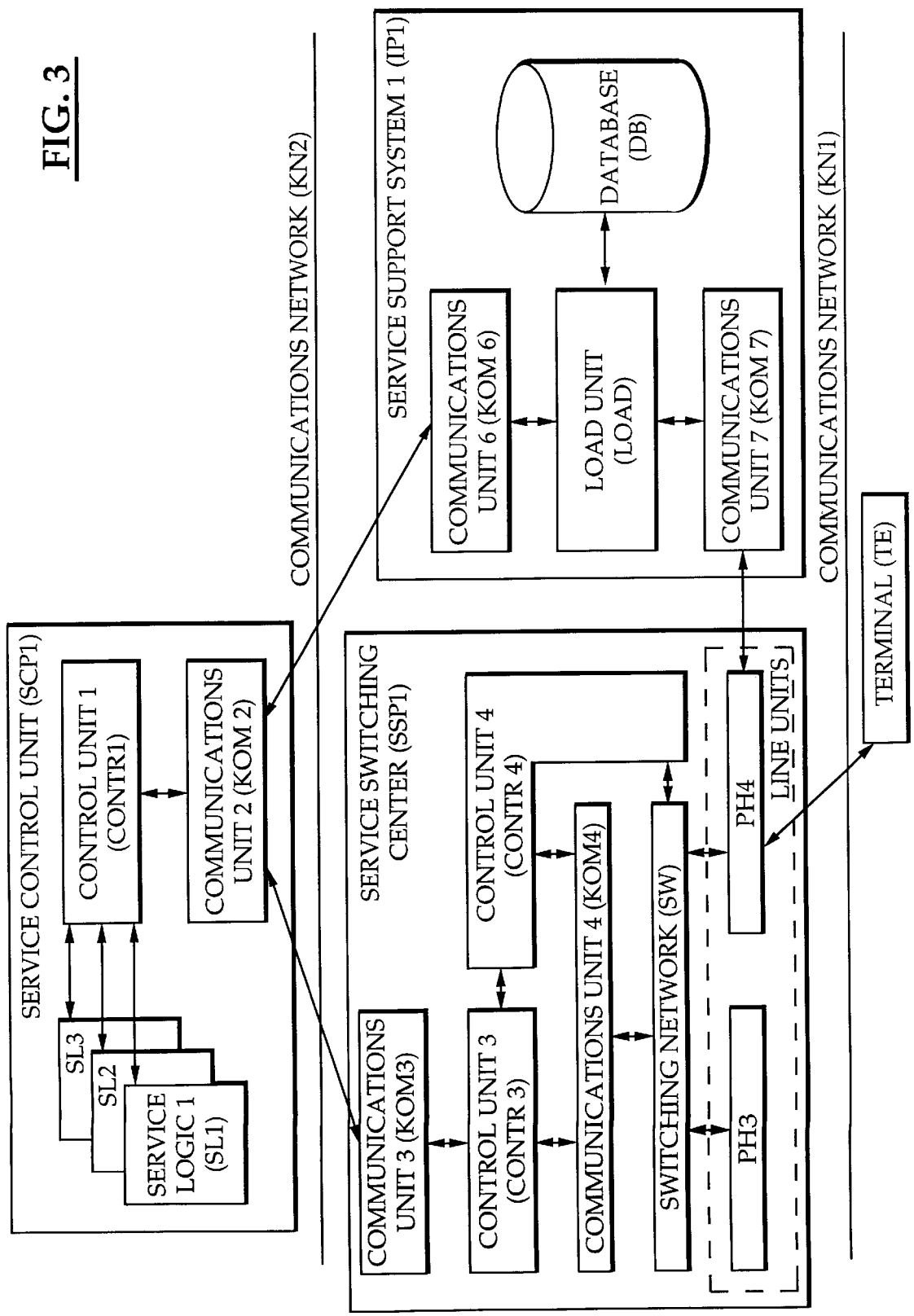
FIG. 3 is a detailed block diagram of the part of the communications environment shown in FIG. 2.

FIG. 3 shows the service control unit SCP1, the service switching center SSP1, the service support system IP1, and the terminal TE.

The service control unit SCP1 comprises a control unit CONTR1, a communication unit KOM2, and three service logics SL1 to SL3. The control unit CONTR1 exchanges data with the service logics SL1 to SL3 and with the communication unit KOM2, which, in turn, exchanges data via the communications network KN2. The communication unit KOM2 provides the communications services necessary for the exchange of messages with the service switching centers SSP1 to SSP2 and the service support systems IP1 to IP3 via the communications network KN2. This communication may be based on a signaling network according to protocol No. 7 of the CCITT on which the INAP protocol (INAP=intelligent network application protocol) is superposed.

The control unit CONTR1 is responsible for the general sequence control in the service control unit SCP1. On reception of a request message, here the request message REQ2, it activates that of the service logics SL1 to SL3 which corresponds to this request, here the service logic SL1. For activation, it starts the service program assigned to the service logic. Furthermore, it causes a load message to be sent to the service support system IP1, here the message MLOAD, which causes the control program assigned to this service logic, here the control program PRO, to be loaded into the terminal TE.

The service control unit SCP1 may also have a different number of service logics, or not all of the telecommunications services assigned to the service logics may be provided using the method according to the invention. In the latter case, the activation of such service logics would not cause a control program to be loaded into the requesting terminal. The transmission of the load message may also be initiated by the activated service logic. It is also possible to check prior to the transmission of the load message whether the requesting terminal is designed for running the control program. If that is the case, the control program PRO will be loaded into the terminal. If that is not the case, the control program will not be loaded and the requested telecommunications service will be provided in a simplified version by the activated service logic alone, i.e., without the service logic cooperating with the control program PRO.

Each of the service logics SL1 to SL3 provides the functions required to control a particular telecommunications service. Each of them is formed by a service program and data assigned to this service program. After activation by the control unit CONTR1, each of the service logics SL1 to SL3 provides a respective telecommunications service by determining the further handling of a connection request through the exchange of control messages with the service switching center SSP1 and with the service support system IP1 and controlling the exchange of messages with the terminal TE. By this exchange of messages, an activated service logic, using a suitable protocol, communicates with that control unit in the terminal TE whose operation is controlled by the control program PRO. Thus, the telecommunications service assigned to the service logic SL1, for example, is provided by the service logic SL1 in cooperation with the current control program PRO which controls the functions of the terminal TE.

The service switching center SSP1 comprises two communication units KOM3 and KOM4, two control units CONTR3 and CONTR4, a switching network SW, and two line units PH3 and PH4.

The line units PH3 and PH4 and the communication unit KOM4 exchange data via the switching network SW. The control unit CONTR4 receives signaling data from the communication unit KOM4 and exchanges control data with the switching network SW and the control unit CONTR3, which, in turn, receives signaling data from the communication unit KOM4 and exchanges data via the communication unit KOM3 and the communications network KN2.

The line units PH3 and PH4 provide the interfaces to subscribers of the communication network KN1 and interfaces to tie trunks running to other switching centers. Furthermore, the line unit PH4 provides an interface to at least one bearer and signaling channel which is connected to the service support system IP1.

The communication unit KOM4 serves to receive signaling messages which serve to establish and release connections and to request services. The communication unit KOM3 corresponds to the communication unit KOM2.

The control unit CONTR4 performs the usual control functions in a switching center, and thus controls, among other things, the switching network SW.

The control unit CONTR3 is based on the same hardware and software platform at the control unit CONTR4 and acts on the call-handling control whose operation is controlled by the control unit CONTR4. The control unit detects the signaling of a service request, e.g., the signaling of a connection request including a service identification code representing the called subscriber's number. The capability to act on the call-handling control makes it possible for the control unit CONTR3 to control the further processing of a connection request in accordance with control messages transmitted to the service control unit. Furthermore, based on such control instructions, the control unit CONTR3 can exchange messages with the requesting terminal TE via a signaling channel by means of the communication unit KOM4. If the communication unit COM4 is of a suitable design, the control unit CONTR3 may also exchange messages with the terminal TE via a bearer channel.

The service support system IP1 comprises two communication units KOM6 and KOM7, a load unit LOAD, and a database DB.

The communication unit KOM6 corresponds to the communication unit KOM2. The communication unit KOM7 provides the functional units required to exchange data with the terminal TE via a bearer channel. If the terminal TE has only an analog connection to the communications network KN1, the communication unit KOM7 will include a modem for carrying out the coding necessary for data transmission. In addition to or instead of a modem, the communication unit KOM7 may include modules which permit data communication via a signaling channel, such as the D channel in the ISDN.

The database DB contains several control programs assigned to different telecommunications services. Instead of incorporating the database DB into the service support system, a data center may be provided which can be accessed by several service support systems.

The load unit LOAD controls the loading of control programs stored in the database DB into terminals of the communications network KN1. To this end, it communicates with the load unit in the terminal TE via the communication unit KOM7 in accordance with the load protocol. For this communication, the control unit CONTR3 or the load unit LOAD in the communications network KN1 establishes a bearer channel between the terminal TE and the service support system via the the service switching center SSP1. In the course of this communication, the load unit LOAD sends the control program as a data set in the form of one or more data packets to the load unit in the terminal TE.

It is also possible to transmit these data packets to the terminal TE over a signaling network, thus eliminating the need to establish a bearer channel.

In a second embodiment, the method according to the invention is carried out in a communications environment in which the service-providing system according to the invention is a single switching center or exchange.

This exchange is a private branch exchange, a Centrex exchange, or a normal exchange incorporating additional functions for providing telecommunications services to arbitrary subscribers. This exchange is of the same design as the service switching point SSP1 except that it does not include the communication unit KOM3 and that it comprises additional functional groups corresponding to the service logics SL1 to SL3, the database DB, the load unit LOAD and the control unit CONTR1. These functional groups interact in a manner analogous to that in FIG. 3.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of providing a telecommunications service, comprising the steps of sending a service request (REQ1) from a terminal (TE) to a service-providing system (SU) including part of a communications network (KN1) over which the service request (REQ1) is sent, and activating a service-specific service logic (SL1) of the service-providing system (SU) upon receipt of the service request (REQ1), characterized in that upon receipt of the service request (REQ1), a service-specific control program (PRO) is loaded from the service-providing system (SU) into the requesting terminal (TE), and that the service-specific service logic (SL1) in the service-providing system (SU) cooperates with the service-specific control program (PRO) in the terminal (TE) in providing the telecommunications service, the cooperation in providing the telecommunications service carried out by an exchange of messages between the terminal (TE) and the servicep1roviding system (SU).

2. A method as claimed in claim 1, characterized in that after providing the telecommunications service, the control program (PRO) in the terminal (TE) is deleted.

3. A method as claimed in claim 1, characterized in that the control program (PRO) is loaded from the service-providing system (SU) into the requesting terminal (TE) using a standardized loading method.

4. A method as claimed in claim 1, characterized in that the service request (REQ1) comprises a signaling of a connection request including a service identification code representing the called subscriber's number.

5. A method as claimed in claim 1, characterized in that the service request (REQ1) is detected by a service switching center (SSP1 to SSP3) of the communications network (KN1) which then activates the service logic (SL1) in a central service control unit (SCP1).

6. A method as claimed in claim 5, characterized in that the service-specific control program (PRO) is stored in a service support system (IP1 to IP3) associated with the service switching center (SSP1 to SSP3), and that upon receipt of the service request (REQ1), the service support system (IP1 to IP3) loads the service-specific control program (PRO) into the requesting terminal (TE).

7. A method as claimed in claim 6, characterized in that a plurality of service-specific control programs assigned to different services are stored in the service support system (IP1 to IP3).

8. A method as claimed in claim 1, characterized in that for loading the control program (PRO), a bearer channel is established between the terminal (TE) and the service-providing system (SU).

9. A method as claimed in claim 1, characterized in that for loading, the control program is transferred over a signaling channel.

10. A service-providing system (SU) including part of a communications network (KN1), comprising at least one service logic (SL1 to SL3) serving to provide a telecommunications service, a receiving unit (KOM4) for receiving a service request (REQ1) over the communications network (KN1) from a terminal (TE) requesting a telecommunications service, and a control unit (CONTR1, CONTR3) designed to activate the service logic or a service-specific one (SL1) of the service logics, characterized in that the service-providing system (SU) further comprises a load unit (LOAD) for loading a service-specific control program (PRO) into the requesting terminal (TE) upon receipt of the service request (REQ1), and that the activated service logic (SL1) is for cooperating with the service-specific control program (PRO) in the terminal (TE) in providing the telecommunications service, the cooperation in providing the telecommunications service carried out by an exchange of messages between the terminal (TE) and the service-providing system (SU).

11. A service-providing system as claimed in claim 10, characterized in that the service-providing system (SU) is a switching center for the communications network (KN1).

12. A service-providing system as claimed in claim 10, characterized in that the service-providing system (SU) comprises two or more service switching centers (SSP1 to SSP3) and at least one central service control unit (SCP1, SCP2).

13. A service control unit (SCP1) for a communications network (KN1), comprising at least one service logic (SL1 to SL3) for providing a telecommunications service and a control unit (CONTR1) for activating the service logic or a service-specific one (SL1) of the service logics upon receipt of a service request (REQ1) from a database of a service support system associated with a service switching center, the service request (REQ1) sent to the database from a requesting terminal (TE) over the communications network (KN1), characterized in that the control unit (CONTR1) is for causing a service-specific control program (PRO) to be loaded into the requesting terminal (TE) upon receipt of the service request (REQ1), and that the activated service logic (SL1), associated with a service control unit (SCP1) of a service-providing system (SU) that includes part of the communications network (KN1), is for cooperating with the service-specific control program (PRO) in the requesting terminal (TE) in providing the telecommunications service, the cooperation in providing the telecommunications service carried out by an exchange of messages between the requesting terminal (TE) and the service-providing system (SU).

14. A service control unit (SCP1) as claimed in claim 13, characterized in that after providing the telecommunications service, the control program (PRO) in the terminal (TE) is deleted.

15. A terminal (TE) for connection to a communications network (KN1), characterized by being provided with a memory unit (MEM) for storing a control program (PRO), with a load unit for loading a service-specific control program (PRO) from a service support system (IP1) of a service-providing system (SU), including part of the communications network (KN1), into the memory unit (MEM), and with a control unit for cooperating with a service-specific service logic (SL1) of a service control unit (SCP1) of the service-providing system (SU) in accordance with the loaded service-specific control program (PRO) in providing a telecommunications service, the cooperation in providing the telecommunications service carried out by an exchange of messages between the terminal (TE) and the service-providing system (SU).

16. A terminal (TE) as claimed in claim 15, characterized in that after providing the telecommunications service, the control program (PRO) in the terminal (TE) is deleted.

17. A communications network (KN1) for providing telecommunications services, comprising:

means for sending over the communications network a service request (REQ1) from a terminal (TE) requesting a telecommunications service to a service-providing system (SU) including part of the communications network (KN1); and means for activating a service-specific service logic (SL1) of the service-providing system (SU) upon receipt of the service request (REQ1), characterized in that upon receipt of the service request (REQ1), a service-specific control program (PRO) is loaded from a service support system (IP1) of the service-providing system (SU) into the requesting terminal (TE) and that the service-specific service logic (SL1) in the service-providing system (SU) is associated with a service control unit (SCP1) that cooperates with the service-specific control program (PRO) in the terminal (TE) in providing the service, the cooperation in providing the telecommunications service carried out by an exchange of messages between the terminal (TE) and the service-providing system (SU).

18. A communications network (KN1) as claimed in claim 17, characterized in that after providing the telecommunications service, the control program (PRO) in the terminal (TE) is deleted.

\* \* \* \* \*

UNITED STATES PATENT AND TRADEMARK OFFICE
CERTIFICATE OF CORRECTION

PATENT NO : 6,041,110
DATED : March 21, 2000
INVENTOR(S): Lautenschlager et al

It is certified that error appears in the above-identified patent and that said Letters Patent is hereby corrected as shown below:

At col. 8, line 33 (claim 1, line 17), cancel "service1providing" and substitute --service-providing--.

At col. 9, line 19 (claim 11, line 1), insert --(SU)-- after "system"; and at line 22 (claim 12, line 1), insert --(SU)-- after "system".

At col. 10, line 40 (claim 17, line 18), insert --telecommunications-- prior to "service,".

Signed and Sealed this

Sixth Day of February, 2001

Attest:

Q. TODD DICKINSON

*Attesting Officer*  *Director of Patents and Trademarks*